US009571635B2

(12) United States Patent
Fan

(10) Patent No.: US 9,571,635 B2
(45) Date of Patent: Feb. 14, 2017

(54) AUTOMATIC ACCOUNT INFORMATION RETRIEVAL AND DISPLAY

(71) Applicant: Yang-cheng Fan, San Jose, CA (US)

(72) Inventor: Yang-cheng Fan, San Jose, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/045,198

(22) Filed: Oct. 3, 2013

(65) Prior Publication Data

US 2015/0099496 A1  Apr. 9, 2015

(51) Int. Cl.
*H04M 3/42* (2006.01)
*H04W 4/16* (2009.01)
*G06F 21/31* (2013.01)
*H04L 29/08* (2006.01)

(52) U.S. Cl.
CPC ........ *H04M 3/42042* (2013.01); *G06F 21/313* (2013.01); *H04L 67/306* (2013.01); *H04W 4/16* (2013.01); *H04M 2201/42* (2013.01)

(58) Field of Classification Search
CPC .... H04M 3/42042; H04M 1/57; H04M 1/575; H04M 2207/18; H04M 1/72519; H04M 3/42059; H04M 3/42068; H04M 3/5183; H04M 1/576; H04M 2242/22; H04M 3/493; H04M 3/42102; H04M 3/42; H04M 2201/42; H04W 4/16; G06F 21/313; H04L 67/306
USPC ........................................................ 455/415
See application file for complete search history.

(56) References Cited

U.S. PATENT DOCUMENTS

| | | | |
|---|---|---|---|
| 4,788,682 A | 11/1988 | Vij et al. | |
| 4,805,209 A | 2/1989 | Baker, Jr. et al. | |
| 5,008,930 A | 4/1991 | Gawrys et al. | |
| 5,974,135 A | 10/1999 | Breneman et al. | |
| 7,697,666 B2 | 4/2010 | Gandhi et al. | |
| 7,724,890 B1 | 5/2010 | Conrad et al. | |
| 7,881,442 B2 | 2/2011 | Renner et al. | |
| 8,204,870 B2 | 6/2012 | Mukkamala et al. | |
| 8,437,460 B2 * | 5/2013 | Daniell et al. | 379/201.02 |
| 8,555,085 B2 | 10/2013 | Khoury | |
| 8,600,019 B1 * | 12/2013 | Cooper et al. | 379/93.03 |
| 8,606,242 B2 | 12/2013 | Kedefors et al. | |
| 8,775,315 B2 | 7/2014 | Casalaina et al. | |
| 8,775,517 B1 * | 7/2014 | Goldman | G06Q 50/01 705/319 |
| 2006/0045243 A1 | 3/2006 | Durga et al. | |

(Continued)

*Primary Examiner* — Kathy Wang-Hurst
*Assistant Examiner* — B. M. M Hannan
(74) *Attorney, Agent, or Firm* — Fountainhead Law Group P.C.

(57) ABSTRACT

Techniques for retrieving and displaying information from a business system on a mobile computing based on contextual details are disclosed. The contextual details can include caller identification information and contact identifiers associated with the caller identification information stored a contacts record in a mobile computing device. Contextual details may include caller identification information, contact identifiers, user preferences, job functions, time/date, and location. Based on the specific details of a particular context, an associated layout definition can be determined. The layout definition specifies the information and analysis to retrieve from the business system and the manner in which to display the information in a graphical user interface if a mobile computing device.

11 Claims, 10 Drawing Sheets

(56) References Cited

U.S. PATENT DOCUMENTS

| | | |
|---|---|---|
| 2009/0036102 A1 | 2/2009 | Ho |
| 2009/0310774 A1* | 12/2009 | Hendricks et al. ...... 379/265.13 |
| 2011/0096914 A1 | 4/2011 | Eng et al. |
| 2011/0317828 A1* | 12/2011 | Corfield ................... 379/265.02 |
| 2012/0036440 A1* | 2/2012 | Dare et al. .................... 715/734 |
| 2012/0084231 A1* | 4/2012 | McNaught ......... G06Q 30/0283 705/400 |
| 2012/0115449 A1* | 5/2012 | Bruchelt ....................... 455/415 |
| 2013/0031086 A1* | 1/2013 | Strelec .............. G06F 17/30539 707/722 |
| 2013/0054430 A1* | 2/2013 | Hart, Jr. ............. G06Q 10/0875 705/30 |
| 2013/0073859 A1* | 3/2013 | Carlson et al. ............... 713/176 |
| 2013/0225139 A1* | 8/2013 | Moran et al. ................. 455/415 |
| 2013/0244632 A1* | 9/2013 | Spence et al. ................ 455/415 |
| 2014/0093061 A1* | 4/2014 | Corfield et al. ......... 379/265.02 |
| 2014/0274002 A1 | 9/2014 | Hogan et al. |
| 2015/0073955 A1* | 3/2015 | Gilman .......................... 705/34 |
| 2015/0100390 A1* | 4/2015 | Neal ............................ 705/7.38 |

\* cited by examiner

AUTOMATIC ACCOUNT INFORMATION RETRIEVAL AND DISPLAY

BACKGROUND

Unless otherwise indicated herein, the approaches described in this section are not prior art to the claims in this application and are not admitted to be prior art by inclusion in this section.

The present invention relates generally to customer service, and in particular to systems and methods for using the caller identification information determined during an incoming call to a mobile computing device to automatically retrieve timely information that is most likely germane to the conversation.

There are many scenarios in which a customer might call a business. For instance, a customer may call to discuss the status of an order or to ask a question about an invoice or bill. The call may be routed to a mobile representative (e.g., a salesperson) who will answer the call using his or her mobile communication device, such as a smartphone, tablet computer, or the like. Due to the increasingly high computing capability and network connectivity of such mobile communication devices, it is possible for authorized representatives to access detailed information stored maintained in remotely accessible business systems from wherever they are.

In remotely accessible business systems, like a customer relationship management (CRM) system, information may be accessed using a corresponding application or general purpose web browser executed on a mobile computing device. Using the mobile computing device, the representative may explore the customer data to obtain information to service or sell to their customers. Such on-demand mobile data access capability is increasingly more important as representatives are more frequently away from their offices and desktop computers and laptop computers.

SUMMARY

Embodiments of the present invention include systems and methods for retrieving and displaying information from a business system based on caller identification information and other contextual details using a mobile computing device. One embodiment is a method implemented in a mobile computing device that includes detecting caller identification information associated with a call, identifying a contact identifier in response to the caller identification information, determining a layout definition based on contextual details comprising the contact identifier. The layout definition includes specifications for retrieving and displaying information from a business system. Such method may also include generating a request for information comprising the contact identifier, sending the request for information from the mobile computing device to the business system, and receiving in response to the request for information, information associated with the contact identifier.

In one embodiment, the contextual details further include a user identifier associated with the mobile computing device.

In one embodiment, the user identifier is associated with a particular job function, and receiving the information includes displaying the information in a graphical user interface associated with the job function.

In one embodiment, the method further includes displaying the information on a display device of the mobile computing device during the call according to the layout definition.

In one embodiment, detecting the caller identification information includes accessing a call log in the mobile computing device.

In one embodiment, the layout definition includes specifications for an alert or a reminder based on analysis of the information.

In one embodiment, identifying a contact identifier includes comparing the caller identification information with contact records stored in the mobile computing device.

Another embodiment includes a non-transitory computer readable medium having instructions stored therein, that when executed by a computer processor in a mobile computing device, cause the computer processor to be configured for detecting caller identification information associated with a call, identifying a contact identifier in response to the caller identification information, determining a layout definition based on contextual details comprising the contact identifier. The layout definition includes specifications for retrieving and displaying information from a business system. The instructions further cause the computer processor for generating a request for information comprising the contact identifier, sending the request for information from the mobile computing device to the business system, and receiving in response to the request for information, information associated with the contact identifier.

Yet another embodiment includes a mobile computing device having a computer processor, and a non-transitory computer readable medium coupled to the processor. The non-transitory computer readable medium stores instructions, that when executed by the computer processor, cause the computer processor to be configured to detect caller identification information associated with a call, identify a contact identifier in response to the caller identification information, determine a layout definition based on contextual details comprising the contact identifier. The layout definition includes specifications for retrieving and displaying information from a business system. The instructions further cause the computer processor to generate a request for the information comprising the contact identifier, send the request for information from the mobile computing device to the business system, and receive in response to the request for information, information associated with the contact identifier.

The following detailed description and accompanying drawings provide a better understanding of the nature and advantages of the present invention.

DETAILED DESCRIPTION

Figure 1:
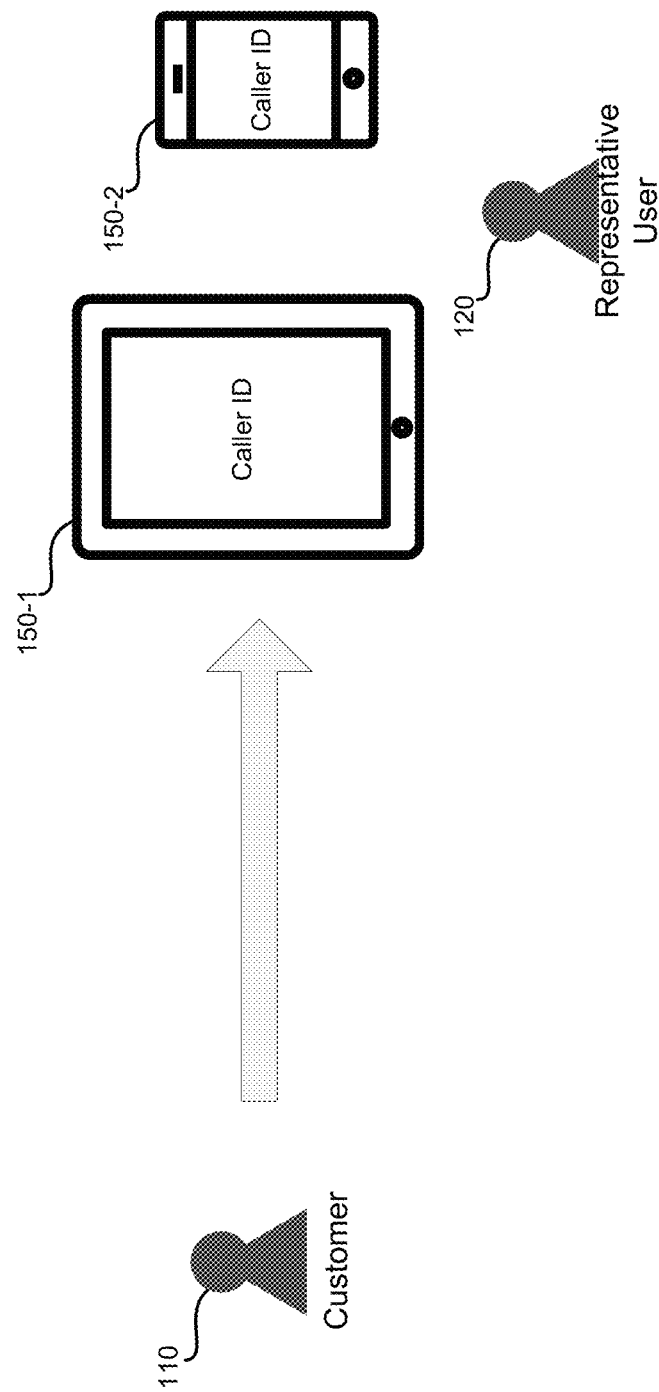
FIG. 1 illustrates an incoming customer call with caller identification information.

Embodiments of the present disclosure include systems and methods for automatically identifying and retrieving information from a business system using a mobile computing device based on contextual details, such as caller identification information, user identification, location, and time/date. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Overview

Embodiments of the present disclosure include techniques for systems and methods for automatically retrieving and displaying specific information from a business system on a mobile computing device based on caller identification information and other contextual details. In one embodiment, when a mobile computing device receives or logs a call from a specific contact or telephone number, it may access the remote business system to retrieve information associated with the contact or telephone number. For example, the caller identification information for a particular telephone call, either in progress or previously completed, may be associated with a particular customer or contact. Based on the association, the mobile computing device may generate a request for information stored in a business system, such as a customer relationship management (CRM) system. In such embodiments, the request for information may include a request for specific information. Accordingly, the request for information may include a contact identifier, a definition of the specific information or analytics needed (i.e., a query), or specifications for visualizations of the analysis. The request for information may be customized for a particular user, such as a sales representative, associated with the mobile computing device.

In response to the request, the mobile computing device may receive the requested information and/or analytics. Based on preferences, authorization levels, and job roles or functions associated with the user and/or the mobile computing device, the requested information and/or analytics may be displayed on a user interface device. In such embodiments, the content and layout of the user interface (UI) used to display the requested information may be specified in a layout definition. The layout definition may be associated with a number of associated contextual details, such as representative user identifiers, job role or function, the location of the mobile computing device, the time/date, the caller identification information, and/or the call status (i.e., in progress or completed). The layout definition may also include specific layout details that define the relative layout and content of reports, analytics, controls, alerts, etc., in the graphical user interface (GUI) displayed on a mobile computing device. Various embodiments are described in more detail in reference to the following scenarios and examples discussed below.

FIG. 1 illustrates a typical scenario in which a client or customer 110 calls representative user 120. The representative user 120 may an employee associated with a particular organization, business, or company. When the customer 110 calls, the representative user 120 may answer the call using one or more types of mobile computing devices 150, such as tablet computer 150-1, smart phone 150-2, or the like. When calling, the customer 110 may call the representative user's 120 telephone number, or other address, associated with one of the mobile communication devices 150 directly. Alternatively, the customer 110 may call the main business line of the corresponding business that may than route the telephone call to the mobile computing device 150 associated with representative user 120. In either scenario, the mobile computing device 150 may detect caller identification information included in the telephone call or the notification of the telephone call.

Using the caller identification information, the mobile computing device 150 determine a corresponding contact or customer. The association between the caller identification information and corresponding contact or customer, may be stored in an address or contacts list stored in the mobile computing device 150. The address or contacts list may be unique to or associated with a specific representative user 120 associated with mobile computing device 150. Alternatively, the address or contacts list may be centrally managed. Accordingly, the address or contacts list stored in the mobile computing device may be synchronized with an external master address or contacts list. For example, a sales team may share a single customer list that includes the main telephone numbers of each customer as well as individual mobile or direct numbers associated with each one of their internal contacts within the customer organizations. As used herein, the term "contact" refers to a particular individual person with whom the representative user 120 may communicate using the mobile computing device 150.

Figure 2:
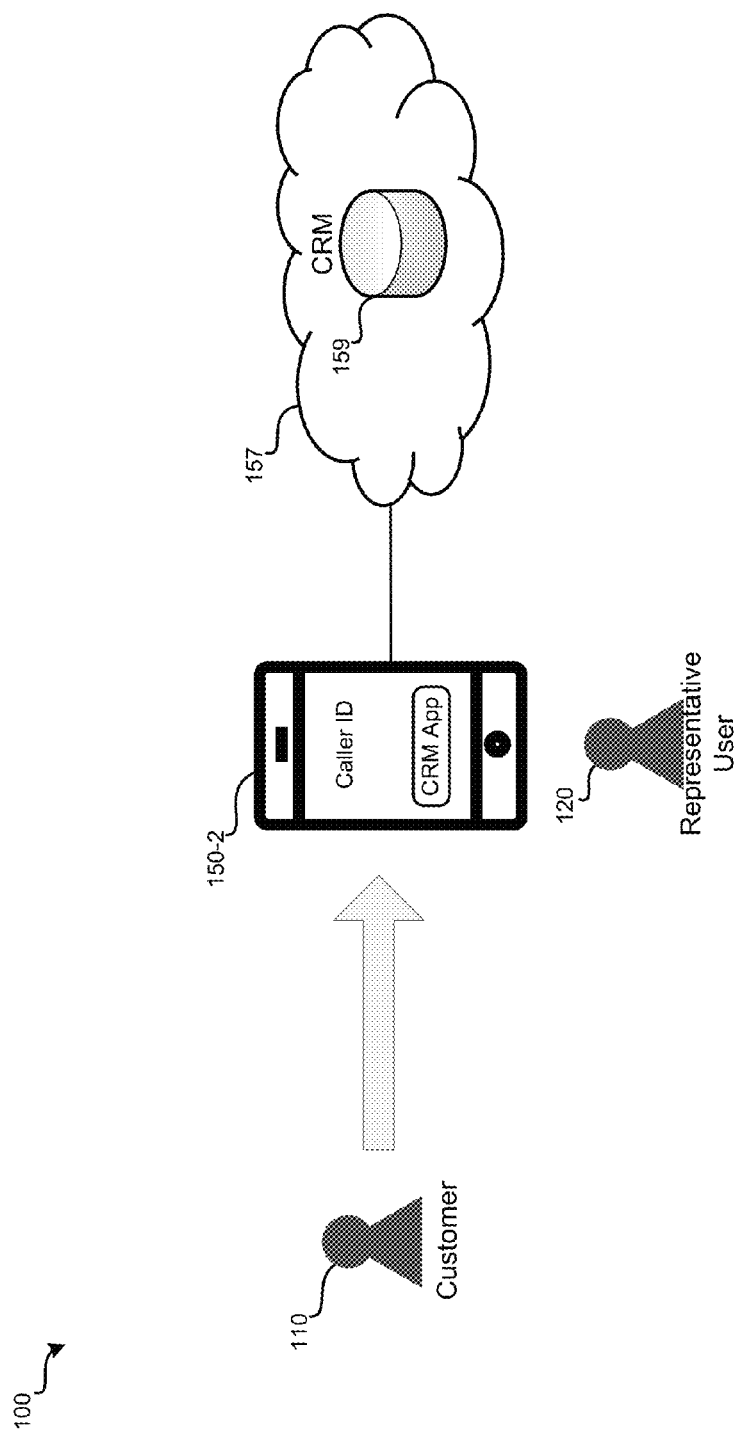
FIG. 2 illustrates a system for remotely accessing information in a business system from a mobile computing device based on the caller identification information, according to an embodiment of the present disclosure.

In various embodiments, the mobile computing device 150 may include functionality for remotely accessing information stored in one or more business systems. For example, the mobile computing device 150 may execute an application, or other software, that causes the mobile computing device 150 to be configured for sending electronic requests for information to, and receiving electronic responses from, a customer relationship management system (CRM). FIG. 2 illustrates one particular system 100 in which the mobile computing device 150 is connected to a network or cloud computing environment 157. Within the network or cloud computing environment 157, a CRM 159 may be implemented in one or more computer systems. While only one CRM 159 shown, in various embodiments of the present disclosure, the cloud computing environment 157 may include any number of CRM's 159, as well as other types of business systems (e.g., Enterprise resource planning (ERP)). For the sake of simplicity, various embodiments of the present disclosure are described in reference to the use of a CRM 159. However, one of ordinary skill in the art will recognize that this example is illustrative only and that embodiments of the present disclosure may be used to access any type of remotely accessible business system.

In a conventional remotely accessible business system, when representative user 120 receives a telephone call from the customer 110 using the mobile computing device 150, he or she would need to launch an application, log on to the remote CRM 159, locate a particular customer record, send requests for specific information of interest to the calling customer 110, and then navigate to the information within the GUI. Such practices are inefficient and may cause undesirable delays in responding to inquiries from the customer 110 who is currently on the line. Embodiments of the present disclosure can greatly and advantageously increase the speed and efficacy of the use of the mobile computing device 150 for accessing information stored on a remote CRM 159. For example, by using the caller identification information, the mobile computing device 150 may automatically determine an associated contact and/or customer. Using a layout definition associated with caller identification information and/or the contact/customer identifier, the mobile computing device may also automatically generate a request for information and send the request to the appropriate target business system, such as CRM 159. As used herein, the term "layout definition" refers to a record or file that includes specifications for requesting, receiving, analyzing, and displaying information regarding a specific contact or customer from a remote business system using a mobile computing device 150.

Each layout definition may be associated with one or more sets of contextual data points or details. In addition to being associated with a particular contact or customer associated with the caller identification information of a particular telephone call, a layout definition may be associated with a particular mobile computing device 150, or representative user 120, as well as a particular role or job function of the associated representative user 120. For example, the layout definitions may be specific or customized for all outside sales representative users. However, the layout definitions may also be specifically customized to job functions and responsibilities of a supervising sales representative or director of sales. Accordingly, the level, amount, or type of data accessible may be dependent on an authorization level associated with the representative user's 120 role or function within the organization. A layout definition associated with a director of sales may provide additional information or functionality that layout definition associated with a junior level salesperson may not include. For example, where one layout definition may allow the representative user 120 to schedule a follow-up telephone call with the customer 110, another layer definition may allow the representative user 120 to assign the task of the follow-up telephone call to another representative user 120.

Example Contextual Details and Associated Layout Definitions

Figure 3:
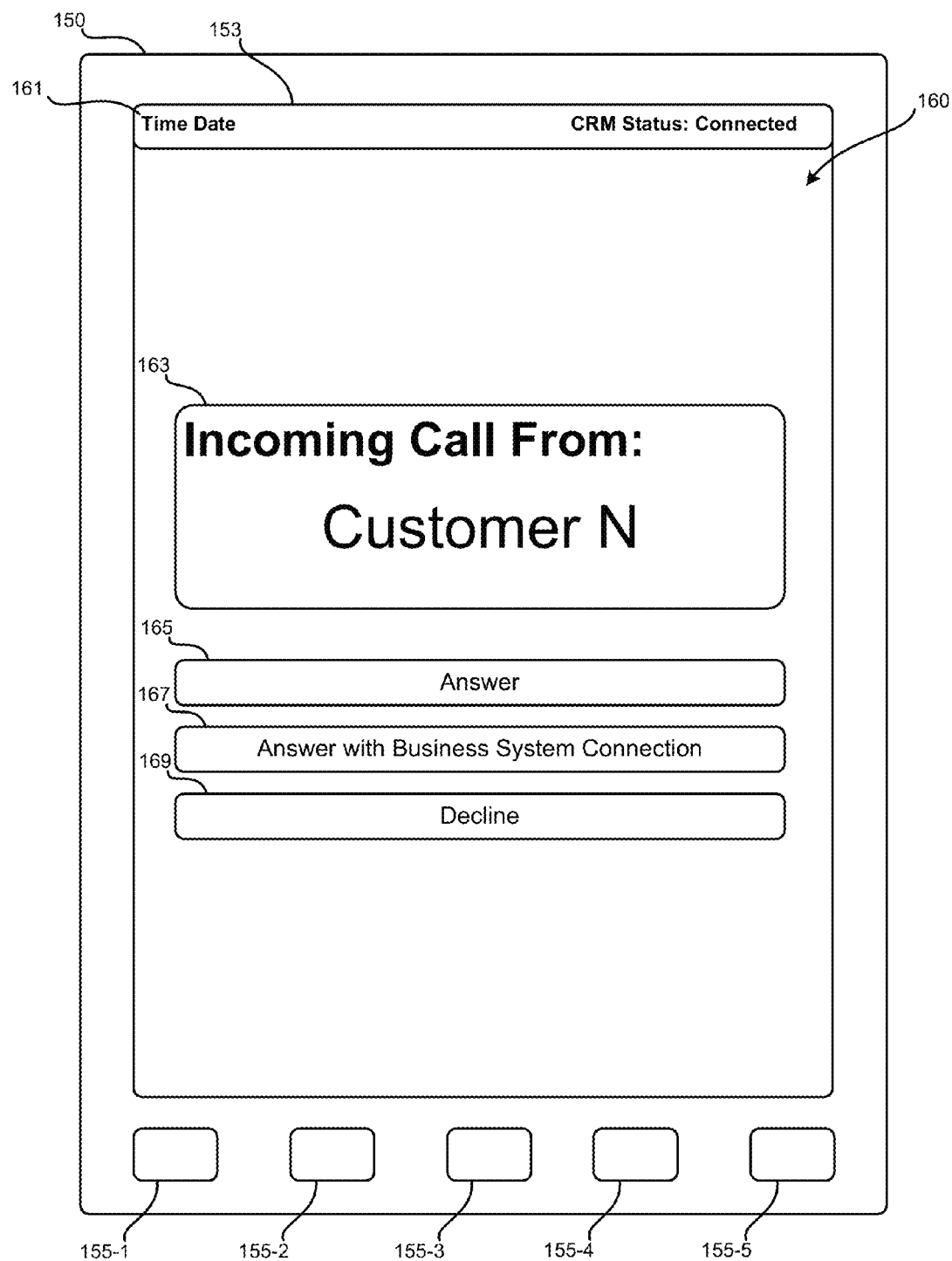
FIGS. 3-6 illustrates example graphical user interfaces (GUI) with context specific layout in a mobile computing device, according to an embodiment of the present disclosure.

Additional contextual details with which a particular layout definition may be associated are described in reference to a number of example user interfaces and scenarios illustrated in FIGS. 3 through 6. In one embodiment, a mobile computing device 150, as illustrated in FIG. 3, may be configured to receive an incoming call. For example, the mobile computing device 150 may execute an application that couples it to one or more electronic communication networks, such as the Internet, a PSTN, a cellular telephone network, or a proprietary electronic communication network. Accordingly, in addition to traditional telephone calls, the mobile computing device 150 may execute an application for initiating and receiving communications using protocols including, but not limited to, voice over Internet protocol (VoIP), short message services (SMS), and instant messages (IM). The mobile computing device 150 may include a number of physical buttons or controls 155 for operating or invoking various functionality of the mobile computing device 150 or any application executed thereon. For the sake of simplicity, all such electronic communications will be referred to herein as telephone calls.

The mobile computing device 150 may detect an incoming telephone call. In various embodiments, the mobile computing device 150 may indicate that an incoming telephone call has been detected. The indication of an incoming telephone call may include both audio and visual notifications. For example, a notification 163 may be displayed in the GUI 160 on the user interface device 153. Indications of the incoming telephone call may also include an audio component in which the mobile computing device 150 announces the caller identification information to the representative user 120 using text-to-speech functionality.

While detecting the incoming telephone call, the mobile computing device may also detect caller identification information included in the incoming telephone call. Caller identification information may include a main telephone number or identifier associated with the main line of a customer that may be associated multiple individual people. Alternatively, the caller identification information may include direct line, account, or mobile telephone number identifier associated with a particular individual user within the customer organization (i.e., a customer entity).

In some embodiments, the mobile computing device 150 may include an application that monitors incoming telephone calls for known or recognized caller identification information. Activation of the application may be indicated by information presented in the title section 161 of the GUI 160. In such embodiments, the mobile computing device 150 may also present a number of controls 165, 167, and 169 on the GUI 160. Such controls may include the option to answer the telephone normally (i.e. without invoking the functionality of a business system interface application), answer the phone call while simultaneously invoking the business system interface application to establish a connection to the business system, or to decline the call.

When establishing a connection with the business system (i.e., by operating control 167), a telephone call may be handled normally and the caller identification information may be passed to the business system interface application. In some embodiments, executing the business system interface application configures the mobile computing device 150 to be configured to search a local contacts list. Searching the local contacts list may include finding one or more contacts associated with the incoming caller identification information. In the event that the mobile computing device 150 finds a corresponding contact identifier associated with the incoming caller identification information, the mobile computing device 150 may then search for an associated layout definition. In such embodiments, the associated layout definition may include specifications for generating a request for information from the CRM 159. In various embodiments, the associated layout definition is simply associated with contact identifier or the caller identification information. However, in other embodiments, the associated layout definition may be associated with other contextual details.

Figure 4:
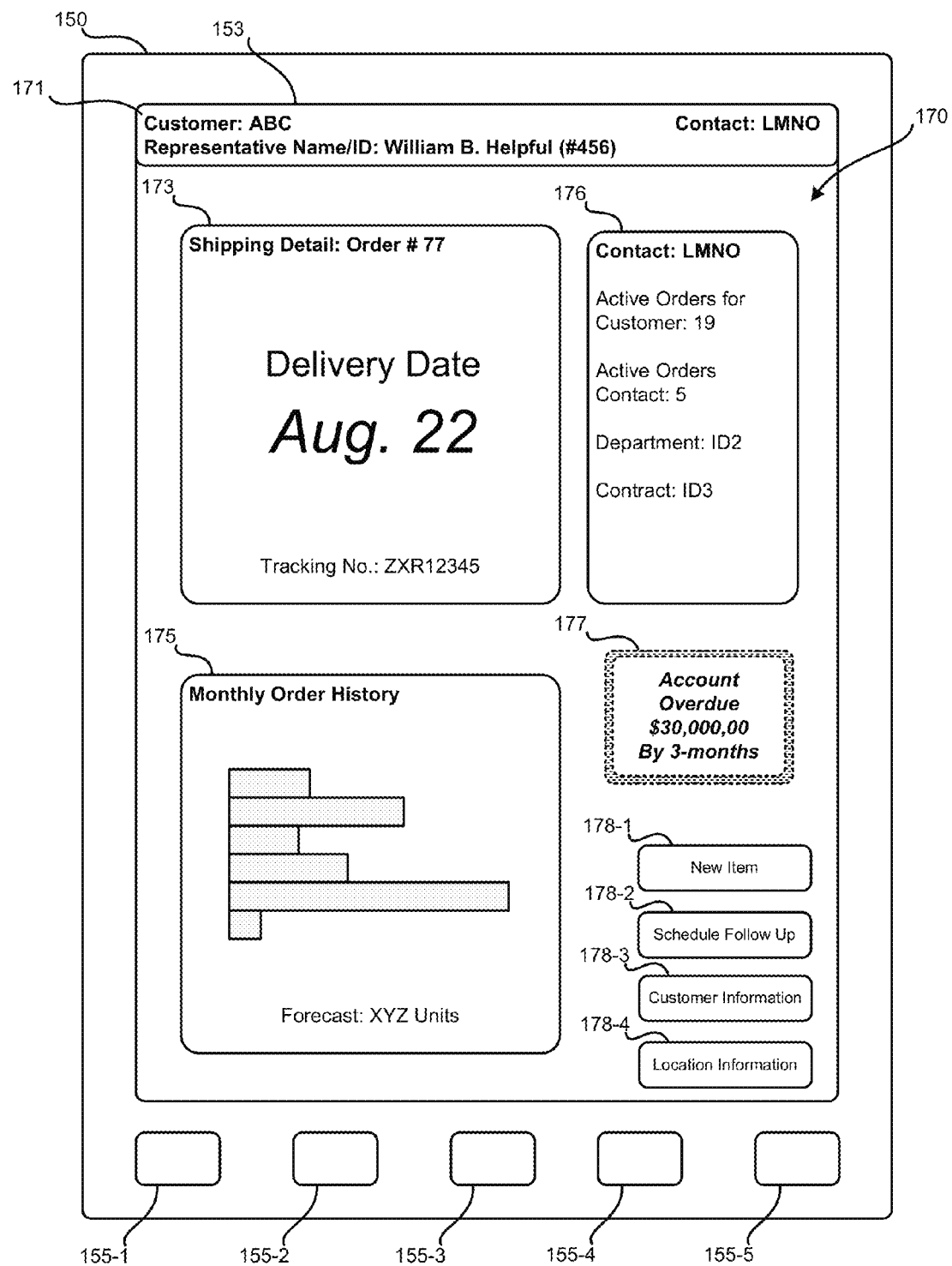

To illustrate such contextual details, FIG. 4 illustrates a GUI 170 displayed on the user interface device 153 of mobile computing device 150. As illustrated, the caller identification information, or associated customer/contact identifier, may be displayed in the title section 171. In the scenario illustrated, the title section 171 includes a customer name and a contact name. Accordingly, the layout and content of the GUI 170 may be specific to the identified customer and contact. Furthermore, the specific layout and content of the GUI 170 may also be associated with the identity or role of the user associated with the mobile computing device 150. In the particular example shown, based on the applicable contextual details, the GUI 170 may include various data regions.

For example, the data regions may include a data region 173 that displays relevant timely information from the CRM 159 about the customer or the contact. For instance, data region 173 may include specific details about a particular order, such as the expected delivery date and tracking information, in which the identified customer and/or contact is likely to be interested. Furthermore, GUI 170 may also include information and statistics in the data region 176 for the customer/contact. In the particular example shown, data region 176 shows both the number of active orders for the customer and the number of active orders for the contact as well as information (i.e., identifiers) regarding the customer/contact's name or department. The GUI 170 may also include a data region 175 that presents historical and/or forecast information for the particular customer or contact. Such information can be helpful in evaluating the value of the customer/contact or the likelihood of a future sale or contract. All the necessary information and analysis for generating the underlying analytical data of the information displayed in the data regions 173, 175, and 176 may be defined in the associated layout definition.

In addition to defining the necessary information and analysis that may be included in the information request message sent to the CRM 159, the layout definition may also include a number of alert definitions that define conditions under which an alert will be presented in the GUI 170. For example, the layout definition may define a number of checks or thresholds that would trigger an alert message, such as the alert shown in alert region 177, to be displayed in the GUI 170. For example, one check may be to verify whether the particular customer/client is current in their bills. If the associated customer/client is past due, the mobile computing device 150 may display the alert 177 in a manner that is attention grabbing (e.g., flashing, rendered in a bright color, etc.). The display of the alert 177 may also be accompanied by an audio alert so that the representative user 120 of the mobile computing device 150 is more likely to be made aware of the alert 177 even if the user is not looking at GUI 170 when the alert is triggered. The content, style, and layout of the component regions of the GUI 170, such as data regions 173, 175 and 176 or alert region 177 may be defined in a layout definition. In some embodiments, the layout definition is associated with other contextual details, such as the particular time or date. For example, the alert 177 may be defined in a layout definition associated with a particular end of quarter reconciliation.

In other embodiments, the GUI 170 may also include a number of controls 178, such as controls for defining a new data item 178-1, and controls for initiating reminders, emails, or scheduled follow-up telephone calls, such as the schedule follow-up call control 178-2. Any controls included in the GUI 170 may invoke functionality internal and external to the business system interface application for accessing the CRM 159.

For instance, the location information control 178-4 control may invoke the location determination functionality, such as GPS functionality, of the mobile computing device 150. The mobile computing device may determine its location and then determine the current distance to the address or location of the customer or caller. The address or distance information can then be used by the mobile computing device 150 to calculate directions or estimated time of arrival to the caller's location. Such embodiments can advantageously help a mobile salesperson manage the expectations of his or her customers.

As previously discussed, the layouts and content of the data regions and the alert regions of the GUI 170 may be customized according to the preferences of the associated representative user 120 or a predetermined scheme. For example, an accounts receivable accounting representative may have more information regarding the account payment history, while a sales representative might have more information about past, present, and future sales for a particular customer/contact.

Figure 5:
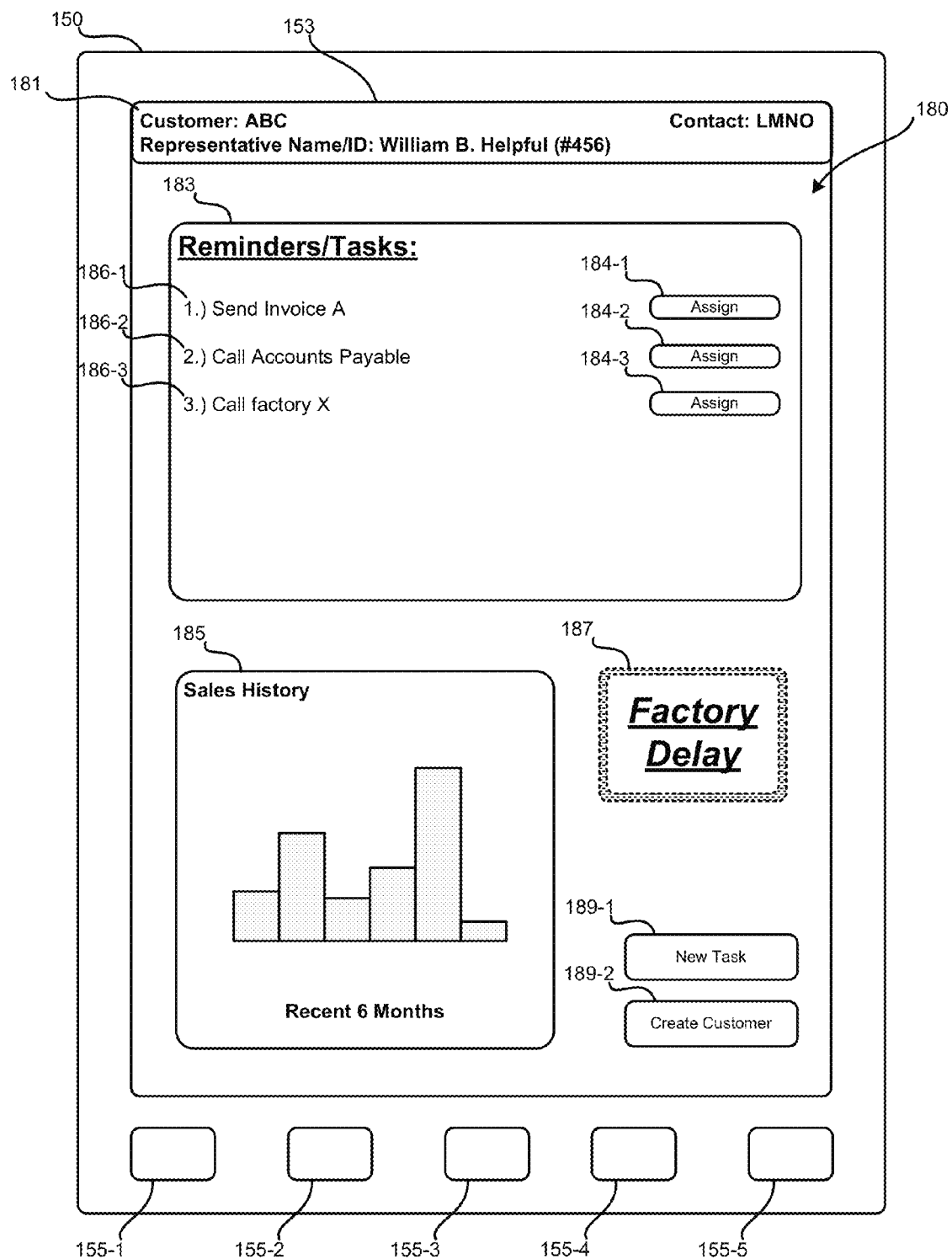

Some embodiments of the present disclosure include a GUI 180 that can be specialized according to the authorization level or job function of a particular representative user 120. FIG. 5 illustrates a GUI 180 based on a layout definition associated with a particular role, authorization level, or job function. As illustrated, the specifics of the role, authorization level, or job function may be displayed in the title section 181 of the GUI 180. For example, the title section 181 may indicate a sales representative "William B. Helpful (#456)" is associated with the GUI 180. The name or identifier of the sales representative may be associated with the role of supervisor salesperson. Accordingly, the associated layout definition may include specifications for specialized information regions 183, 185, and 187 or access restricted controls 184 and 189 that are specific to supervisor level sales people. Based the layout definition associated with supervisor sales people, region 183 may include a number of reminders or tasks 186 that the associated representative user may be authorized to assign to other representative users using controls 184. In the example shown, each one of the numbered reminders/tasks 186 can be assigned to another member of the sales team using the corresponding assigned control 184. Similarly, the information region 185 may include sales history for the entire group of salespersons that the sales representative associated with the GUI 180 supervises. This may differs from other GUIs defined by layout definitions associated with other members of the sales team, in that the GUIs for the other members of the sales team may only include a sales history for their own accounts and not the sales histories of their fellow sales team members.

In addition, specialized alerts, such as alert region 187, may be set up to alert the authorized associated representative user of conditions that fall within their set of job functions or responsibilities. For example, the alert section 187 includes an alert of a potential factory delay that the associated representative user 120 should investigate.

In addition to the various information and alert regions, the GUI 180 may also include controls 189 for invoking functionality of the mobile computing device 150 and/or the CRM system 159 to which the associated representative user 120 is authorized to use or access. For example, only a supervisor representative user 120 may have access to controls 189-1 for creating a task or 189-2 creating a new customer/contact entry in the CRM system 159.

Figure 6:
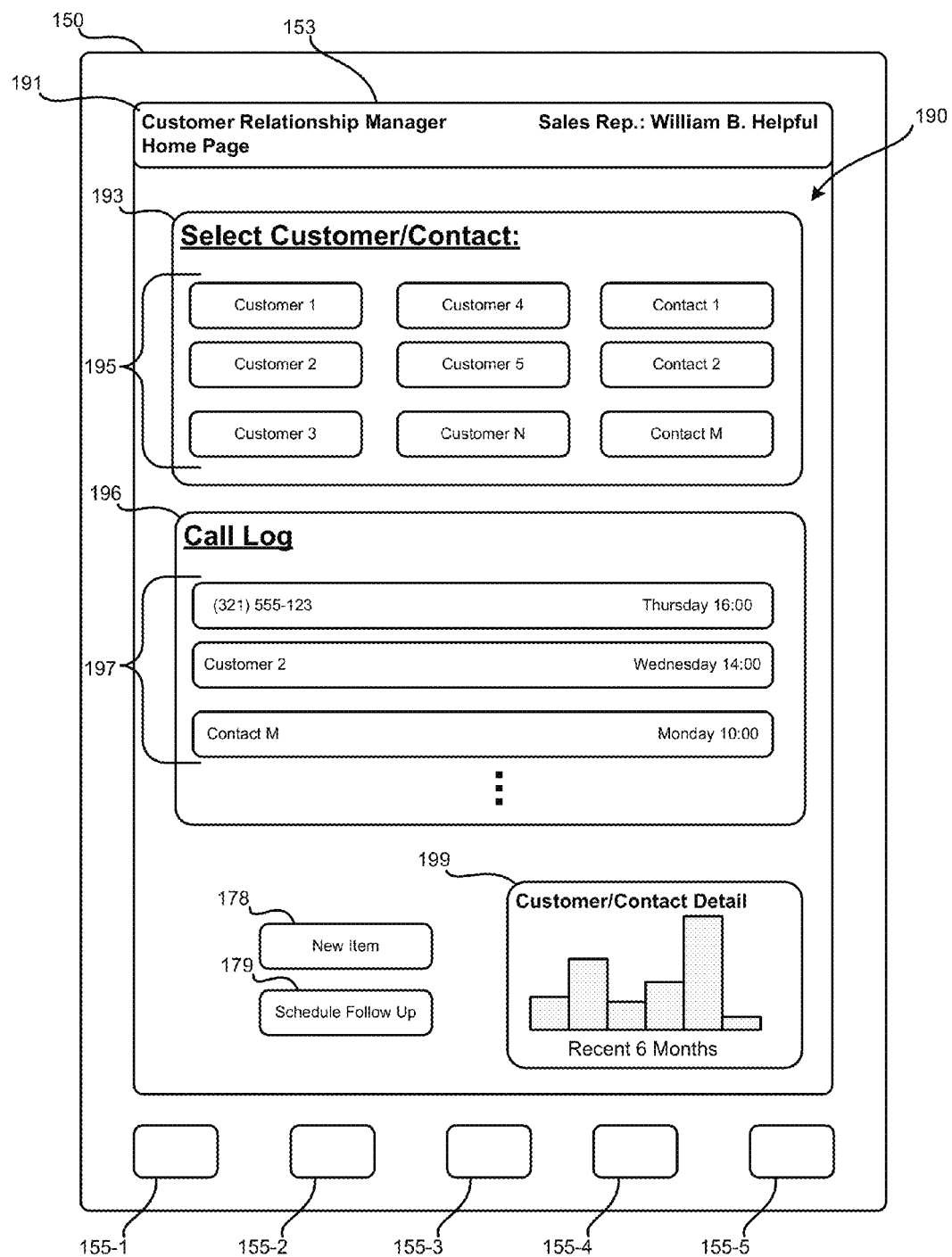

Other embodiments of the present disclosure include a homepage GUI 190 for accessing information in a remote business system, such as CRM 159, using the mobile computing device 150, as illustrated in FIG. 6. As shown, the GUI 190 includes a title region 191 associated with a particular sales representative. While not explicitly shown in FIG. 6, the title region 191 may also include the name of the company, or other identifier, associated with the mobile computing device 150, or a job function associated with the sales representative. In the particular example illustrated, the title region 191 includes indication of a homepage for CRM 159 access functionality of the mobile computing device 150.

In the view shown in FIG. 6, the GUI 190 may include a number of regions for invoking various CRM data access functionality. Region 193 may include a listing of customers and contacts 195. Each listing may also include a control, (e.g., a button) for accessing information about the selected customer/client according to an associated or default layout definition. Region 196 may include a call log. The call log may include a record of some number M, where M is a natural number, of the most recently received incoming or outgoing telephone calls 197. The record of the telephone calls 197 may also include controls for accessing information in the CRM 159 for the customer/client associated with the listed telephone calls 197. Each listed call 197 may include a timestamp. The timestamp may include data from which the elapsed time since the telephone call was conducted may be calculated. The elapsed time since the telephone call may be included as one of the contextual details associated with the particular layout definition. Accordingly, a layout definition associated with a particular elapsed time period may include a specification to alert a sales representative to send the customer/contact updated or renewed marketing material or collateral.

In some embodiments, the GUI 190 may also include a data region 199 for displaying customer/contact information for one or more of the listed telephone calls 197 or customer/contacts 195. Accordingly the region 199 may include recent historical sales information for the top customers/contacts 195 and/or the most recent telephone calls 197.

Figure 7:
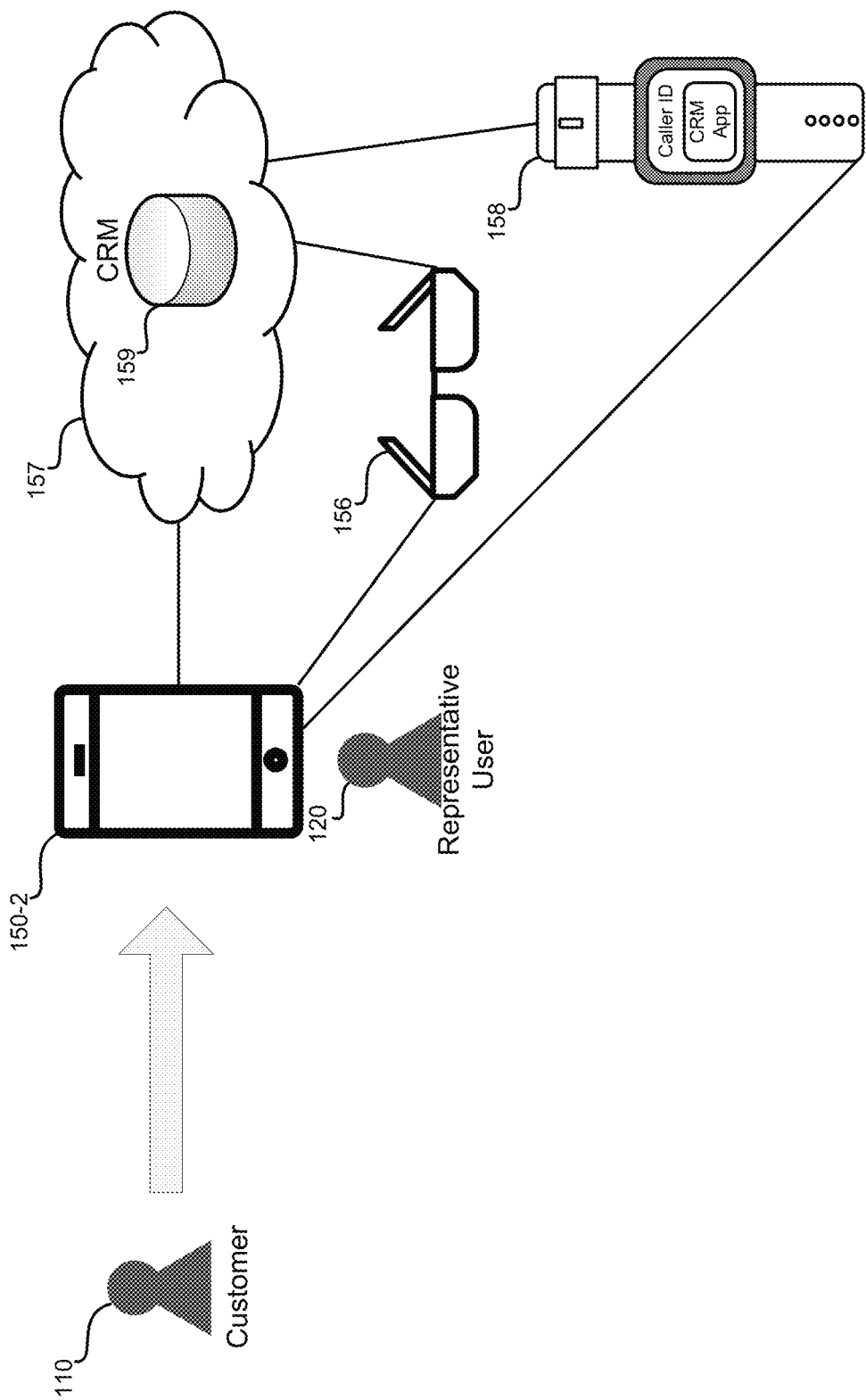
FIG. 7 illustrates a system for remotely accessing information in a business system from a mobile computing device based on the caller identification information with display of the retrieved information in a secondary device, according to an embodiment of the present disclosure.

In the examples described above in reference to FIGS. 3 through 6, the GUIs are generated according to an associated layout definition and are displayed on the user interface device of the mobile computing device 150. However, because various embodiments of the present disclosure contemplate accessing the data retrieved from the CRM 159 while the representative user 120 is on the telephone with the customer/client, it is advantageous at times for the mobile computing device 150 to display the resulting GUIs on separate display device. For example, the mobile computing device 150 may be coupled to a secondary display device such as a tethered pair of augmented reality viewing glasses 156, smart watch 158 (e.g., e-paper watch from Pebble™), or tablet computer or display, as depicted in FIG. 7. In such embodiments, the representative user 120 may continue to speak with the customer/client while simultaneously viewing the timely information displayed in the secondary display device according to the associated layout definition.

Mobile Computing Device

Figure 8:
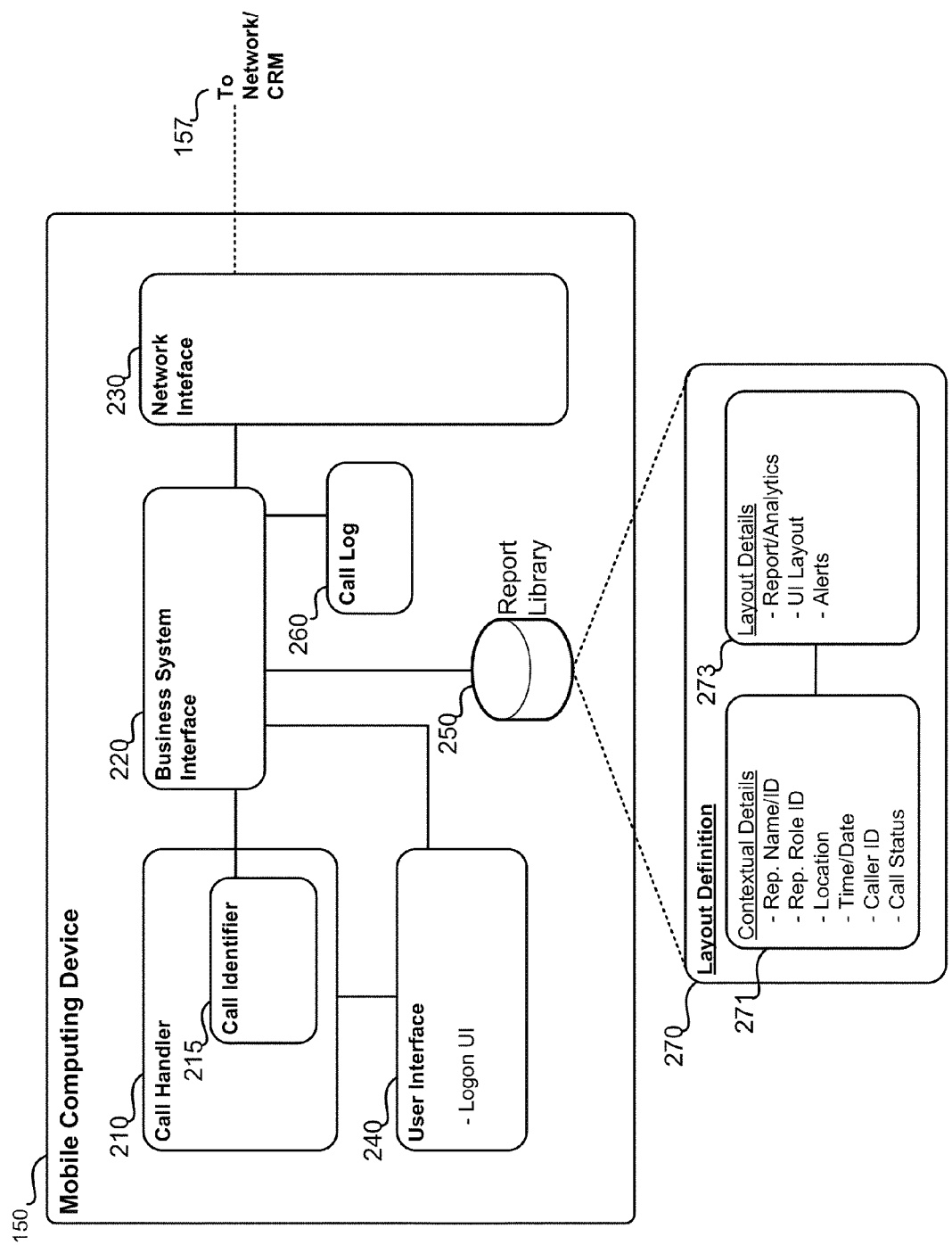
FIG. 8 is block diagram of a mobile computing device, according to various embodiments of the present disclosure.

FIG. 8 illustrates a schematic of a mobile computing device 150 according to various embodiments of the present disclosure. As shown the mobile computing device 150 may include a call handler 210, a business system interface 220, a network interface 230, a user interface 240, a call log 260 and a layout library 250, or some sub combination thereof. The call handler 210 may include may initiate and/or receive telephone calls with other entities. Accordingly, the call handler 210 may include a cellular communications module for conducting voice and data sessions using one or more types of cellular communication protocols or media. For example, the call handler 210 may include combinations of hardware, firmware, and software for communicating using global system for mobile communication (GSM), code division multiple access (CDMA), general packet radio service (GPRS) or other standardized or proprietary cellular communication protocols.

The call handler 210 may also include a call identifier 215 for receiving, interpreting, decoding, or otherwise detecting caller identification information from an incoming call, message, or signal. In some implementations, the caller identification information may include a telephone number, an account name, an account number, or other information that can be used to identify the user or entity associated with the incoming call. In some embodiments, the call identifier 215 may access contact lists or telephone books stored in a memory (not shown) in mobile computing device 150 to search for contact data of customer or contacts that are associated with the caller identification information. The call identifier 215 may pass caller identification information or the contact data to the business system interface 220.

Alternatively, the business system interface 220 may access call log 260 that includes a record of previously conducted telephone calls and associated caller identification information and/or a contact identifier. Accordingly, the business system interface 220 may obtain caller identification information and/or the contact identifier from the call log 260 directly. In some embodiments, the business system interface 220 may automatically obtain the caller identification information and/or the contact identifier for the most recent telephone calls from the call log 260. For example, the business system interface 220 may access the call log 260 when a telephone call is concluded, periodically, or whenever the business system interface 220 is invoked on the mobile computing device 150. As used herein, the term "contact identifier" may include a company name, a person's name, an account number, or the like, that is associated with a corresponding customer or contact. Accordingly, the contact identifier can be used to designate or specify the corresponding customer or contact.

In one embodiment, the business system interface 220 may use the caller identification information and/or the contact identifier to search the layout library 250 for an associated layout definition. The business system interface 220 may also determine associated layout definitions based on other contextual details, such as a name or identifier, role, authorization level, and preferences, of the representative user 120. The business system interface 220 may also determine associated layout definitions based on the geographic location of the mobile computing device 150 and/or a time and date. For example, during business hours, an associated layout definition may include specifications that include a control in the resulting for transferring the call to another representative. However, outside of normal business hours, an associated layout definition may include specifications that omits or disables such a control.

Based on the layout definition, the business system interface 220 may generate a corresponding request for information and send it to the network/CRM 157 using the network interface 230. The network interface 230 can transmit and receive electronic communications to and from the network/CRM 157 over one or more electronic communication protocols or media.

In response to the request for information, the business system interface 220 may receive information from the CRM and analyze it according to the associated layout definition. Once all the necessary analysis is completed, the business system interface 220 may display the information and the resulting analysis in the user interface 240 according to the specifications of the associated layout definition.

As previously discussed, a layout definition 270 may include associated details 271 for identifying the layout definition 270, as well as the layout details 273 for requesting, analyzing, and displaying the resulting information and analysis. The associated details 271 may include a number of contextual details with which the business system interface 220 may match the layout definition 270 with a particular scenario and/or customer/client. As shown, the associated details 271 may include a representative user's 120 name/identifier, a representative user's 120 job role identifier, a location of the mobile computing device 150, a time/date, caller identification information, and call status. Each particular set of associated details 271 may be associated with a particular set of layout details 273. The layout details 273 may include specifications that define the data needed from the CRM 157, define the specific analysis to be performed on the data, define the reports of the information and analysis, define specific checks, alerts, or reminder, and specify the layout of the resulting GUI.

Method

Figure 9:
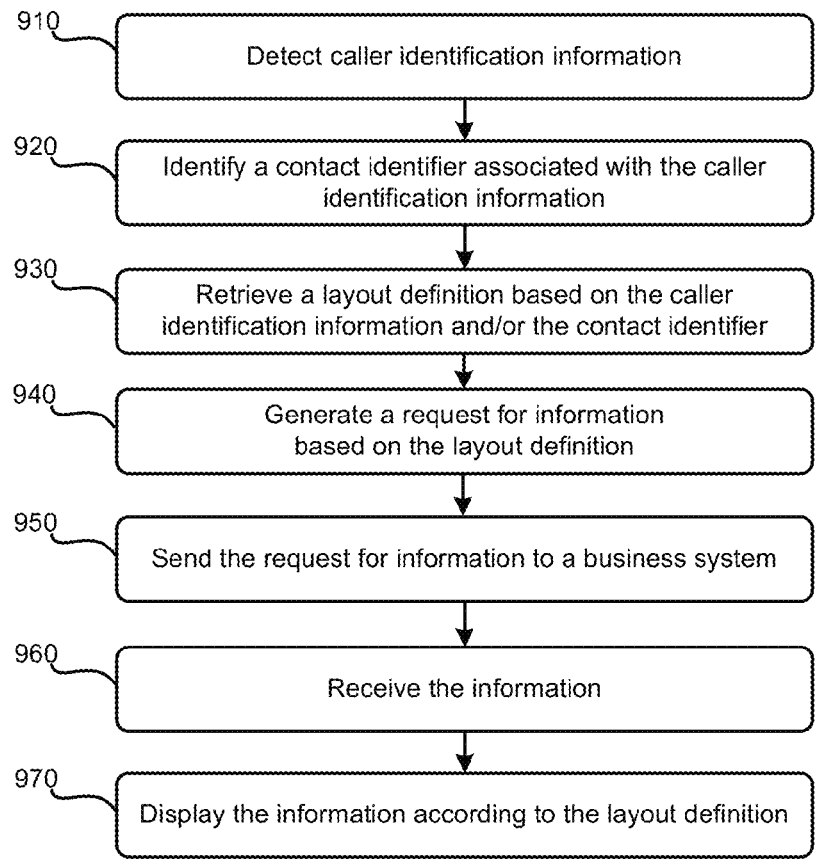
FIG. 9 is flowchart of a method, according to various embodiments of the present disclosure.

FIG. 9 is a flowchart of a method 900 for displaying customer/client information based on caller identification information and other contextual details, according to various embodiments of the present disclosure. Such methods can begin at box 910, in which a mobile computing device 150 detects caller identification information for call. The call may be an incoming or an outgoing call, message, or signal. The caller identification information may be determined before, during, and after the call has been initiated or accepted. At box 920, the mobile computing device 150 may identify a contact identifier associated with the caller identifier information. The contact identifier may be determined based on a search of locally stored contact or telephone records within the mobile computing device 150. Alternatively, the contact identifier may be determined based on a search of contact or telephone book records stored on one or more remote data stores. Such contact records may be manually set up by the associated representative user 120 of the mobile computing device 150, or maybe associated with the organization are larger group of users (e.g., a group contacts list).

In box 930, the mobile computing device 150 may retrieve a layout definition from a local or remote data store associated with the caller identification information, the contact identifier, and/or other contextual details. The contextual details may include the preferences of a user associated with the mobile computing device 150, the job function of that user, the location of the mobile computing device 150, as well as the time or date. In addition to including or being associated with the contextual details, the layout definition may include specification for retrieving, analyzing, and displaying information received from the business system specific the context surrounding associated with the caller identification or contact identifier.

In box 940, the mobile computing device 150 may a generate request for information from an associated business system, such as CRM 159, based on the layout definition. The request for information may be based on a layout definition associated with the caller identification information and/or contact identifier. The request for information may include a request for customer specific data relevant to the job functionalities of the contact or the representative user associated with the mobile computing device 150.

At box 950, the mobile computing device 150 may send the request for information to the target business system. In embodiments in which the request for information also includes specifications for specific analysis, the business system may provide the requested raw information, as well as processed information. Accordingly, in response to the request for information, the mobile computing device 150 may receive the information and various types of resulting analysis and reports, at box 960. Using layout details contained in the associated layout definition, the mobile computing device 150 may then display the information on a user interface or display device included in or coupled to the mobile computing device 150, at box 970.

Various actions and steps of method 900 may be implemented in combinations of hardware, firmware, and software included in the mobile computing device 150. For example, method 900 may be implemented as application that is stored in a memory and executed in a computer processor of the mobile computing device 150.

Figure 10:
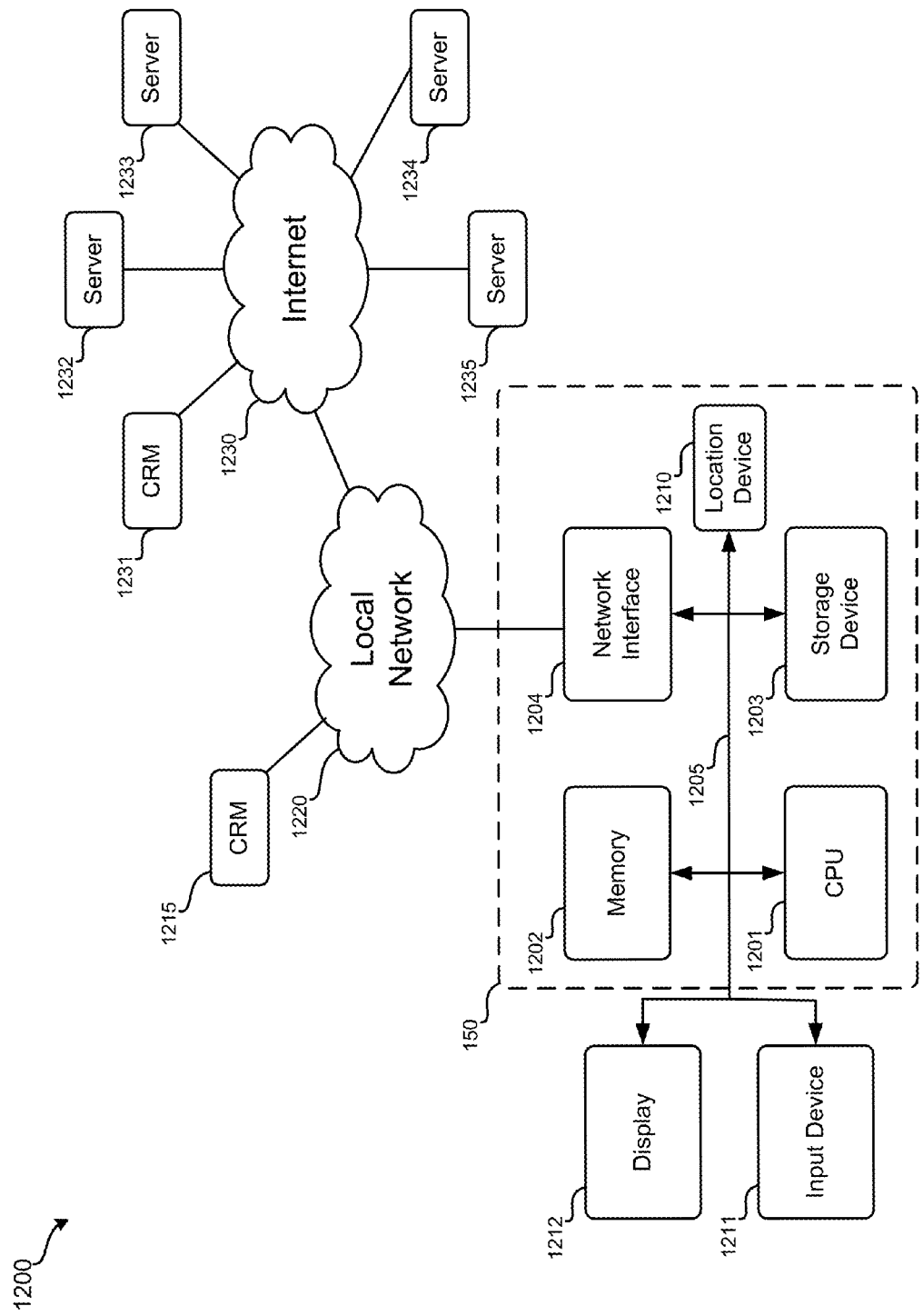
FIG. 10 is block diagram of a mobile computing device that can be used to implement various embodiments of the present disclosure.

FIG. 10 illustrates an example mobile computer system and networks that may be used to implement embodiments of the present disclosure. Mobile computing system 150 includes a bus 1005 or other communication mechanism for communicating information, and a processor 1001 coupled with bus 1005 for processing information. Mobile computing system 150 also includes a memory 1002 coupled to bus 1005 for storing information and instructions to be executed by processor 1001, including instructions for performing the techniques described above. This memory may also be used for storing temporary variables or other intermediate information during execution of instructions to be executed by processor 1001. Possible implementations of this memory may be, but are not limited to, random access memory (RAM), read only memory (ROM), or both. A storage device 1003 is also provided for storing information and instructions. The information instructions can be in the form of computer readable code stored on the storage device, accessible and executable by processor to implement various techniques and methods of the present disclosure. Common forms of storage devices include non-transient, non-volatile computer readable media, for example, a hard drive, a magnetic disk, an optical disk, a CD, a DVD, a flash memory, a USB memory card, or any other medium from which a computer can read.

Mobile computing system 150 may be coupled via the same or different information bus, such as bus 1005, to a display 1012, touchscreen, or liquid crystal display (LCD), for displaying information. An input device 1011 such as a keyboard and/or mouse is coupled to a bus for communicating information and command selections from the user to processor 1001. The combination of these components allows the user to communicate with the system.

Mobile computing system 150 may also be coupled via the same or different information bus, such as bus 1005, to a location device 1010. The location device may include one or more location determination methods and devices to determine the physical location of the mobile computing system 150. For example, the location device 1010 may include a global positioning system (GPS) device for triangulating the physical position of the device using signals received from satellites in geostationary orbit. The location device may also include various other types of sensors for sensing the environment or location of the device. In such embodiments, the location device may receive electromagnetic, optical, or sonic signals from transmitters that the device can interpret to determine its location or use to triangulate its location.

Mobile computing system 150 also includes a network interface 1004 coupled with bus 1005. Network interface 1004 may provide two-way data communication between mobile computing system 150 and the local network 1020. The network interface 1004 may be a local area network (LAN) card to provide a data communication connection to a compatible LAN. The LAN card may include a wireless LAN (WLAN) card for communicating with a corresponding wireless network. In any such implementation, network interface 1004 sends and receives electrical, electromagnetic, or optical signals that carry digital data streams representing various types of information.

Mobile computing system 150 can send and receive information, including messages or other interface actions, through the network interface 1004 to an Intranet or the Internet 1030. In the Internet example, software components or services may reside on multiple different mobile computing systems 150, CRM servers 1015 and 1031, or remote servers 1032-1035 across the network. Software components described above may be implemented on one or more servers. A server 1032 may transmit messages from one component, through Internet 1030, local network 1020, and network interface 1004 to a component on mobile computing system 150, for example. Software components may be implemented on the same system as other components, or on a different machine than other software components. This process of sending and receiving information between software components may be applied to communication between mobile computing system 150 and any of the CRMs 1015 and 1031 and servers 1032 to 1035 in either direction. It may also be applied to communication between any of the CRMs 1015 and 1031 and servers 1032 to 1035.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   detecting, by a mobile computing device, caller identification information associated with a call;
   identifying, by the mobile computing device, a contact identifier in response to the caller identification information;
   determining, by the mobile computing device, a layout definition based on contextual details comprising the contact identifier and a user identifier associated with a user of the mobile computing device, wherein the layout definition comprises specifications for retrieving and displaying information from a business system, wherein the layout definition further comprises specifications for an alert or a reminder set up by the user based on analysis of the information;
   generating, by the mobile computing device, a request for information comprising the contact identifier;
   sending the request for information from the mobile computing device to the business system; and
   receiving, in the mobile computing device, in response to the request for information, information associated with the contact identifier, wherein the user identifier is associated with a particular job function of the user, and wherein receiving the information comprises displaying the information in a graphical user interface associated with the job function, wherein the graphical user interface includes a specific data chart selected on the basis of the user identifier.

2. The method of claim 1 further comprising displaying the information on a display device of the mobile computing device during the call according to the layout definition.

3. The method of claim 1 wherein detecting the caller identification information comprises accessing a call log in the mobile computing device.

4. The method of claim 1 wherein identifying a contact identifier comprises comparing the caller identification information with contact records stored in the mobile computing device.

5. A non-transitory computer readable medium comprising instructions, that when executed by a computer processor in a mobile computing device, cause the computer processor to be configured for:
   detecting caller identification information associated with a call;
   identifying a contact identifier in response to the caller identification information;
   determining a layout definition based on contextual details comprising the contact identifier and a user identifier associated with a user of the mobile computing device, wherein the layout definition comprises specifications for retrieving and displaying information from a business system, wherein the layout definition comprises specifications for an alert or a reminder based on analysis of the information;
   generating a request for information comprising the contact identifier;
   sending the request for information from the mobile computing device to the business system; and
   receiving in response to the request for information, information associated with the contact identifier, wherein the user identifier is associated with a particular job function of the user, and wherein receiving the information comprises displaying the information in a graphical user interface associated with the job function, wherein the graphical user interface includes a specific data chart selected on the basis of the user identifier.

6. The non-transitory computer readable medium of claim 5 wherein the instructions further cause the computer processor to configured for displaying the information on a display device of the mobile computing device during the call according to the layout definition.

7. The non-transitory computer readable medium of claim 5 wherein detecting the caller identification information comprises accessing a call log in the mobile computing device.

8. The non-transitory computer readable medium of claim 5 wherein identifying a contact identifier comprises comparing the caller identification information with contact records stored in the mobile computing device.

9. A mobile computing device comprising:
   a computer processor; and
   a non-transitory computer readable medium coupled to the processor and comprising instructions, that when executed by the computer processor, cause the computer processor to be configured to:
   detect caller identification information associated with a call;
   identify a contact identifier in response to the caller identification information;
   determine a layout definition based on contextual details comprising the contact identifier and a user identifier associated with a user of the mobile computing device, wherein the layout definition comprises specifications for retrieving and displaying information from a business system, wherein the layout definition comprises specifications for an alert or a reminder based on analysis of the information;

generate a request for information comprising the contact identifier;

send the request for information from the mobile computing device to the business system; and receive in response to the request for information, information associated with the contact identifier, wherein the user identifier is associated with a particular job function of the user, and wherein to receive the information the instructions cause the computer processor to be configured to display the information in a graphical user interface associated with the job function, wherein the graphical user interface includes a specific data chart selected on the basis of the user identifier.

10. The mobile computing device of claim 9 wherein the instructions further cause the computer processor to display the information on a display device of the mobile computing device during the call according to the layout definition.

11. The mobile computing device of claim 9 wherein to detect the caller identification the instructions further cause the computer processor to be configured to access a call log in the mobile computing device.

\* \* \* \* \*